(12) United States Patent
Montecalvo et al.

(10) Patent No.: US 7,418,716 B2
(45) Date of Patent: Aug. 26, 2008

(54) METHOD, APPARATUS, SYSTEM, AND ARTICLE OF MANUFACTURE FOR INTERFACING A DEVICE

(75) Inventors: Mark V. Montecalvo, Hillsboro, OR (US); Scott P. Dubal, Hillsboro, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 10/741,032

(22) Filed: Dec. 19, 2003

(65) Prior Publication Data

US 2005/0138644 A1 Jun. 23, 2005

(51) Int. Cl.
*G06F 13/00* (2006.01)

(52) U.S. Cl. ............... 719/321; 719/327; 709/203; 709/205; 709/217

(58) Field of Classification Search ............... 719/321, 719/327; 709/203, 205, 217
See application file for complete search history.

(56) References Cited

U.S. PATENT DOCUMENTS

| | | | | |
|---|---|---|---|---|
| 4,926,322 A | * | 5/1990 | Stimac et al. ............... | 703/23 |
| 5,675,793 A | * | 10/1997 | Crick et al. ............... | 713/1 |
| 5,958,022 A | * | 9/1999 | Wilhelm, Jr. ............... | 710/14 |
| 6,304,929 B1 | * | 10/2001 | Wallach et al. ............... | 710/302 |
| 6,560,641 B1 | * | 5/2003 | Powderly et al. ............... | 709/219 |
| 6,658,459 B1 | * | 12/2003 | Kwan et al. ............... | 709/217 |
| 6,732,249 B1 | * | 5/2004 | Pickreign et al. ............... | 711/202 |
| 6,738,829 B1 | * | 5/2004 | Wiles et al. ............... | 719/321 |
| 6,940,793 B2 | * | 9/2005 | Yamashita et al. ............... | 369/47.39 |
| 6,947,430 B2 | * | 9/2005 | Bilic et al. ............... | 370/395.71 |
| 7,188,111 B2 | * | 3/2007 | Chen et al. ............... | 707/10 |
| 2005/0080953 A1 | * | 4/2005 | Oner et al. ............... | 710/52 |

OTHER PUBLICATIONS

Lamers, L. J., ed. "Information Technology—Small Computer System Interface -2," Working Draft X3T9.2 Project 375D, Revision 10L, Sep. 7, 1993; 32 pp intro., 466 pp text and index.

McLean, P. T., ed. "Information Technology—AT Attachment-3 Interface (ATA-3)," Working Draft X3T13 2008D, Revision 7b, Jan. 27, 1997; 8 pp intro., 168 pp text and index.

* cited by examiner

*Primary Examiner*—Andy Ho
(74) *Attorney, Agent, or Firm*—Konrad Raynes & Victor LLP; Rabindranath Dutta

(57) ABSTRACT

Provided are a method, apparatus, system, and article of manufacture for interfacing a device to a host, wherein in certain embodiments a device interface in the device receives a request generated by a device driver in the host. The device interface processes the request, wherein a plurality of device interfaces corresponding to a plurality of devices are capable of processing the request. An operation associated with the device is executed, by the device interface, in response to processing the request.

24 Claims, 9 Drawing Sheets

METHOD, APPARATUS, SYSTEM, AND ARTICLE OF MANUFACTURE FOR INTERFACING A DEVICE

BACKGROUND

1. Field

The disclosure relates to a method, apparatus, system, and article of manufacture for interfacing a device.

2. Background

A device driver is a program that controls a hardware device, such as, a printer, a disk drive, a keyboard, a network adapter, etc. The device driver may act as a translator between the hardware device and programs that use the hardware device. A hardware device may have a set of specialized commands that can be accessed by the device driver corresponding to the hardware device, where the specialized commands may exploit features of the hardware device. However, programs may access the hardware device by using generic commands that are independent of the hardware device. The device driver, corresponding to the hardware device, may accept the generic commands from the programs and then translate the generic commands into specialized commands for the hardware device.

Hardware devices that are coupled to a computational platform may use device drivers to operate compatibly with the computational platform. For example, a network adapter that is coupled to a personal computer may use a network adapter device driver to operate compatibly with the personal computer. If no device driver corresponding to a hardware device is available on a computational platform, then the hardware device may not operate when the hardware device is coupled to the computational platform.

The device driver corresponding to a hardware device may be distributed with the hardware device or downloaded from a network, such as, the Internet. The device driver corresponding to a hardware device may also be distributed with operating system installs. If a new revision of the hardware device becomes available, then a new device driver corresponding to the new revision of the hardware device may have to be installed in the computational platform. Installing the new device driver may allow the new revision of the hardware device to operate compatibly with the computational platform.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The device driver corresponding to a hardware device may be packaged with the hardware device on a storage media, such as, a CD-ROM or a floppy disk. However, this requires that a user of a computational platform possesses the necessary hardware to read the storage media. In addition, documentation for installation procedures of the device driver may have to be made available to the user.

the device driver is available on the Internet, the computational platform may need to have access to the Internet. If the hardware device being distributed enables Internet access, such as, a modem or a network adapter, it may not be possible to use the new hardware to access the Internet to download the required device driver.

Certain hardware manufacturers may submit their device drivers to the operating system vendor and have the device drivers included in the operating system install. However, the device drivers included with the operating system install can only be updated as often as a new operation system version is released. Therefore, the device drivers included with the operating system may not support the latest available hardware device. In addition, even if device drivers are updated by independent hardware vendors, users may use the device drivers built into the operating system because the device drivers built into the operating system may be readily available and may be simpler to install. Therefore, users may not always run the latest available device driver and the hardware device may not perform optimally or may encounter errors that have already been fixed and could have been avoided.

Certain embodiments provide a single generic device driver, where the generic device driver can interface all current versions of a hardware device, as well as all future versions of similar hardware devices, without requiring the current versions of the hardware device to be backward compatible with an older device driver. In certain embodiments, a device independent layer is added to a hardware device, where the device independent layer exposes an interface that may allow the generic device driver to exploit the features of the hardware device.

Figure 1:
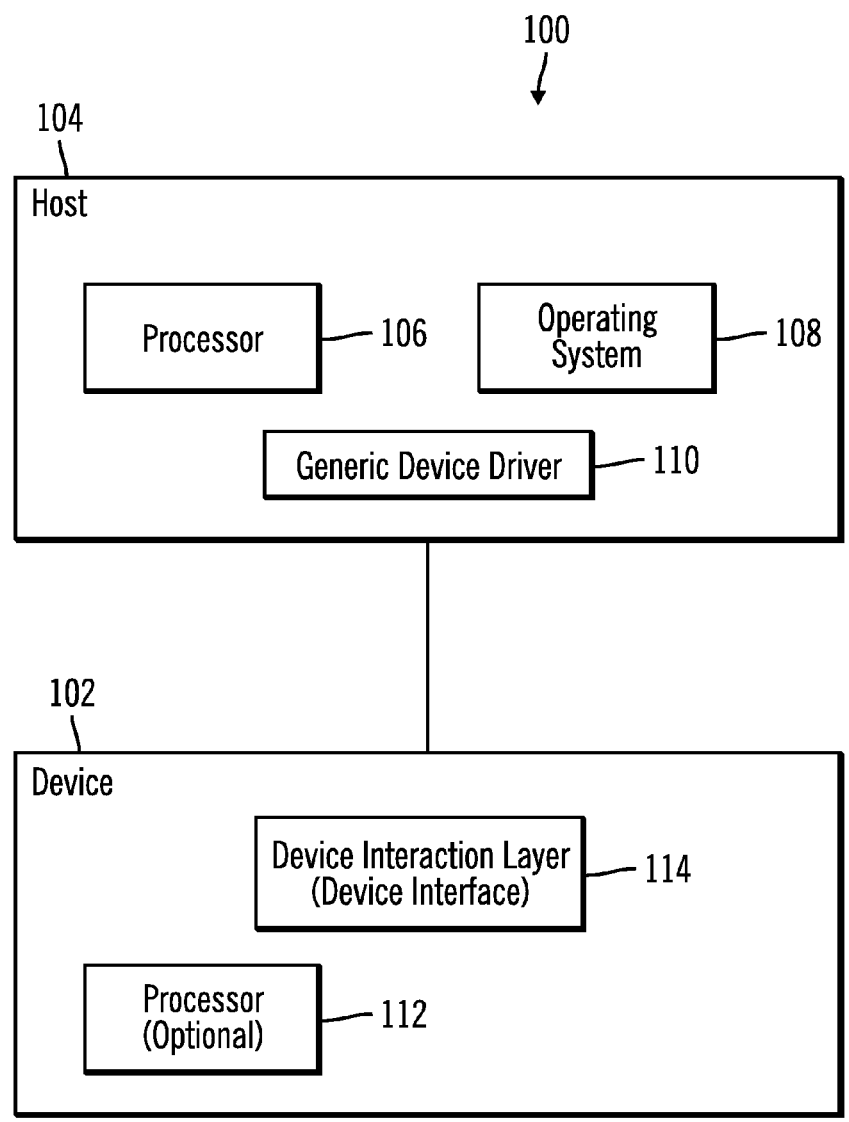
FIG. 1 illustrates a computing environment in which certain embodiments are implemented.

FIG. 1 illustrates a computing environment 100 in which certain embodiments are implemented. A device 102 is coupled to a host 104. While in the computing environment 100 the device 102 is shown external to the host 104, in alternative embodiments the device 102 may be internal to the host 104. The device 102 may be a hardware device, such as, a network adapter, a storage device, a modem, etc., that is capable of interfacing with the host 104. While a single device 102 in shown coupled to the host 104, in certain alternative embodiments a plurality of devices may be coupled to the host 104. The host 104 may be a computational platform, such as, a personal computer, a workstation, a server, a mainframe, a hand held computer, a palm top computer, a telephony device, a network appliance, a blade computer, etc.

The host 104 may include a processor 106, an operating system 108, and a generic device driver 110. The processor 106 may be any processor, such as, a Reduced Instruction Set Computer (RISC) processor, a Complex Instruction Set Computer (CISC) processor, a uniprocessor, a multi-processor, etc. The operating system 108 may allow one or more applications (not shown) to exploit the capabilities of the device 102 via the generic device driver 110.

In certain embodiments, a single generic device driver 110 may be adequate for a class of devices that are similar to the device 102. For example, the generic device driver 110 may allow the operating system 108 to exploit the capabilities of the device 102, as well as the capabilities of a new version of the device 102.

The device 102 may include a processor 112 and a device interaction layer 114. Certain devices may not include the processor 112, and instructions related to such devices may be executed in the host processor 106. The device interaction layer 114 may include software that is implemented specifically for the device 102. The device interaction layer 114 provides an interface, such that, the generic device driver 110 can exploit the capabilities of the device 102. The device interaction layer 114 may also be referred to as a device interface. In certain embodiments, the generic device driver 110 is implemented, such that, the generic device driver 110 can call the interfaces of the device interaction layer 114.

The device interaction layer 114 may run on the host processor 106, the device processor 112 or a microcontroller (not shown). In certain embodiments, the device interaction layer 114 may be implemented in hardware, software, firmware or any combination thereof. In certain embodiments, the device interaction layer 114 is included in a flash memory (not shown) in the device 102.

FIG. 1 illustrates an embodiment in which the generic device driver 110 and the device interaction layer 114 allow different versions of the device 102 to work compatibly with the host 104, without requiring revisions to the generic device driver 110.

Figure 2:
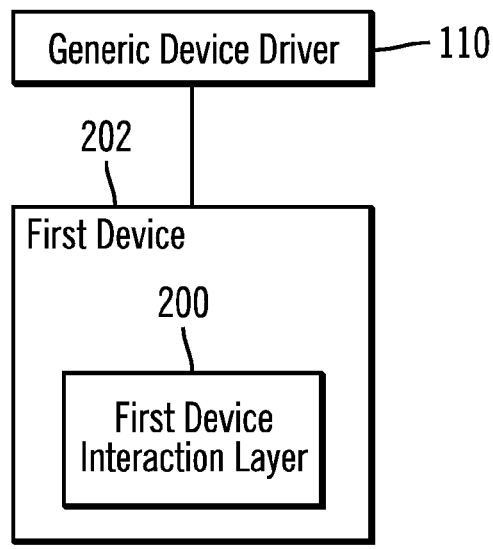
FIGS. 2 and 3 indicate how different devices may couple to the same generic device driver in the computing environment illustrated in FIG. 1.
Figure 3:
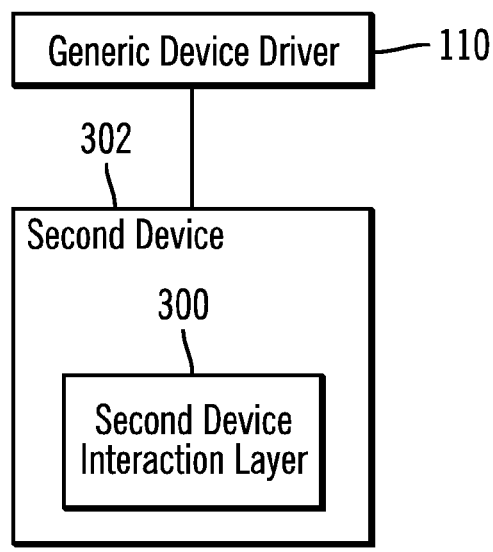

FIGS. 2 and 3 indicate how different devices may couple to the same generic device driver 110 in the computing environment 100 illustrated in FIG. 1.

In FIG. 2, a first device interaction layer 200 exposes interfaces of a first device 202 to the generic device driver 110. In FIG. 3 a second device interaction layer 300 exposes interfaces of a second device 302 to the generic device driver 110. The first device interaction layer 200 is implemented specifically for the first device 202, and the second device interaction layer 300 is implemented specifically for the second device 302.

If the first device 202 is initially coupled to the host 104, then the generic device driver 110 exploits the capabilities of the first device 202 by calling the interfaces of the first device interaction layer 200. Even if the first device 202 is replaced by the second device 302, then the generic device driver 110 does not have to be changed in the host 104 because the second device 302 has a specifically implemented second device interaction layer 300 that can be used by the generic device driver 110 to exploit the capabilities of the second device 302.

Figure 4:
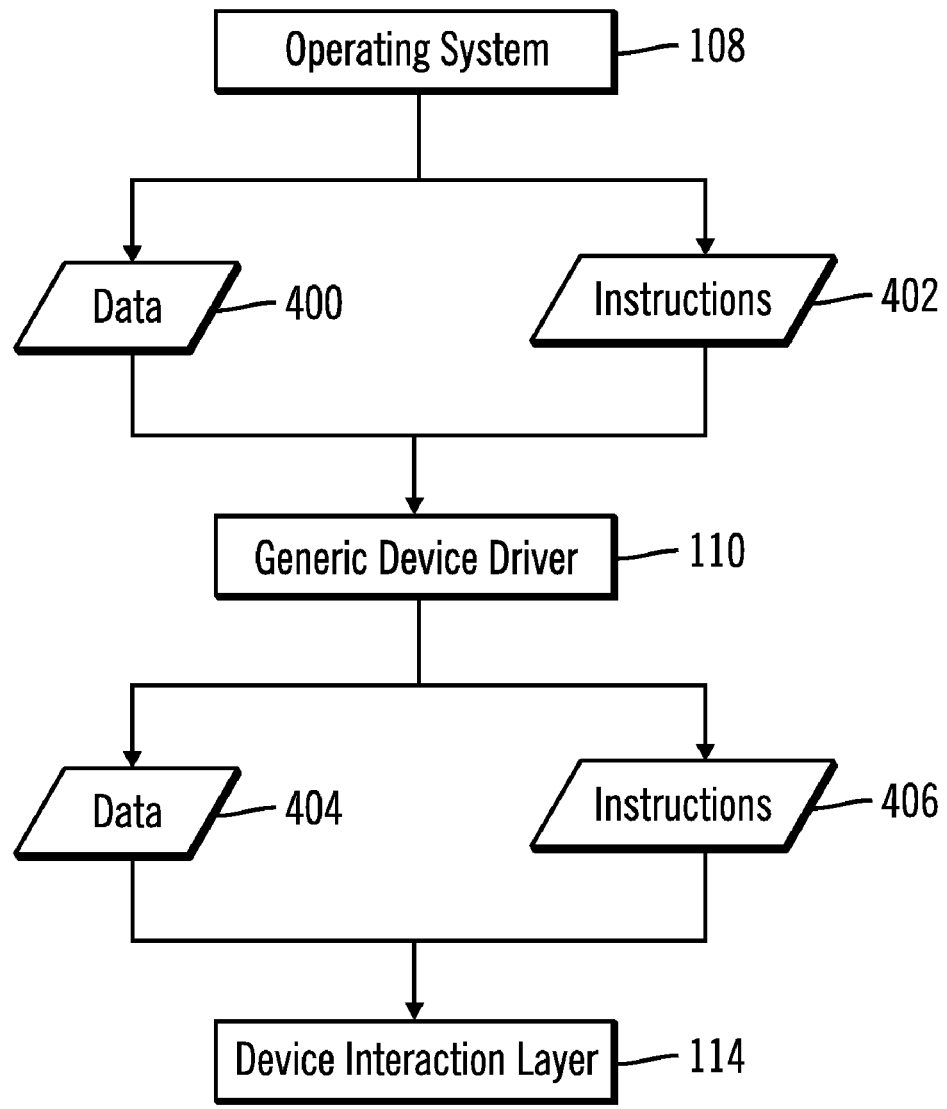
FIGS. 4 and 5 illustrate how data and instructions may be transmitted and received by certain elements of the computing environment illustrated in FIG. 1.
Figure 5:
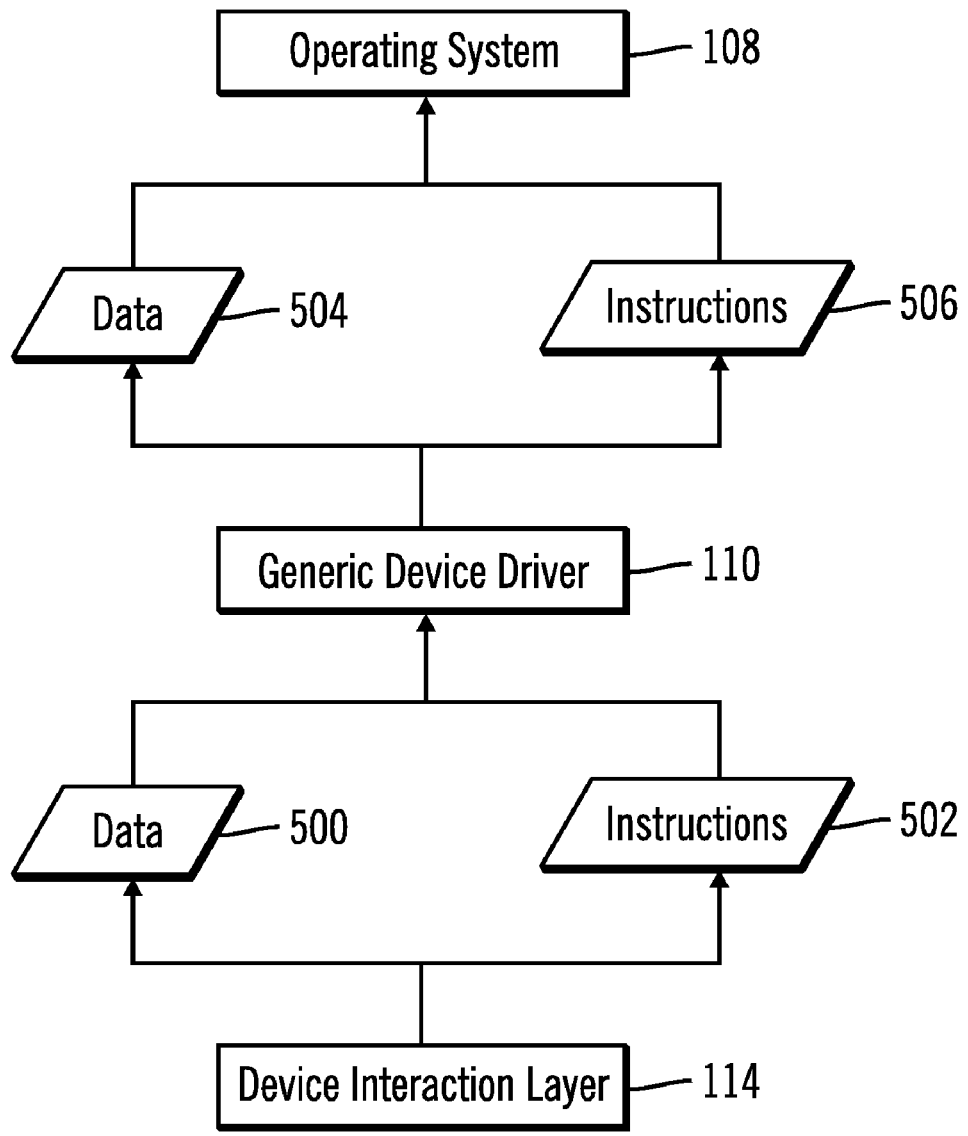

FIGS. 4 and 5 illustrate how data and instructions may be transmitted and received by certain elements of the computing environment 100 illustrated in FIG. 1.

In FIG. 4, an application (not shown) running on the host 104 may send data 400 and instructions 402 to the generic device driver 110 via the operating system 108. The generic device driver 110 may transform the data 400 and the instructions 402 into data 404 and instructions 406 for the device interaction layer 114. The device interaction layer 114 may use the data 404 and the instructions 406 to exploit the capabilities of the device 102.

FIG. 5, the device interaction layer 114 is shown to send data 500 and instructions 502 to the generic device driver 110. In certain embodiments, the data 500 may be a status code that indicates the result of executing the instructions 406 with the data 404, where the instructions 406 and the data 404 were received earlier by the device interaction layer 114 from the generic device driver 110. The instructions 502 may indicate to the generic device driver 110 that the data 500 is a status code.

The generic device driver 110 may transform the data 500 and the instructions 502 into data 504 and instructions 506 for the operating system 108. An application (not shown) that interacts with the operating system 108 may receive the data 504 and the instructions 506 via the operating system 108.

In FIGS. 4 and 5 illustrate embodiments in which data and instructions are exchanged between the operating system 108 and the device interaction layer 114 via the generic device driver 110. A single generic device driver 110 can allow the exchange of data and instructions between the operating system 108 and a plurality of device interaction layers 114 that correspond to a plurality of devices 102.

Figure 6:
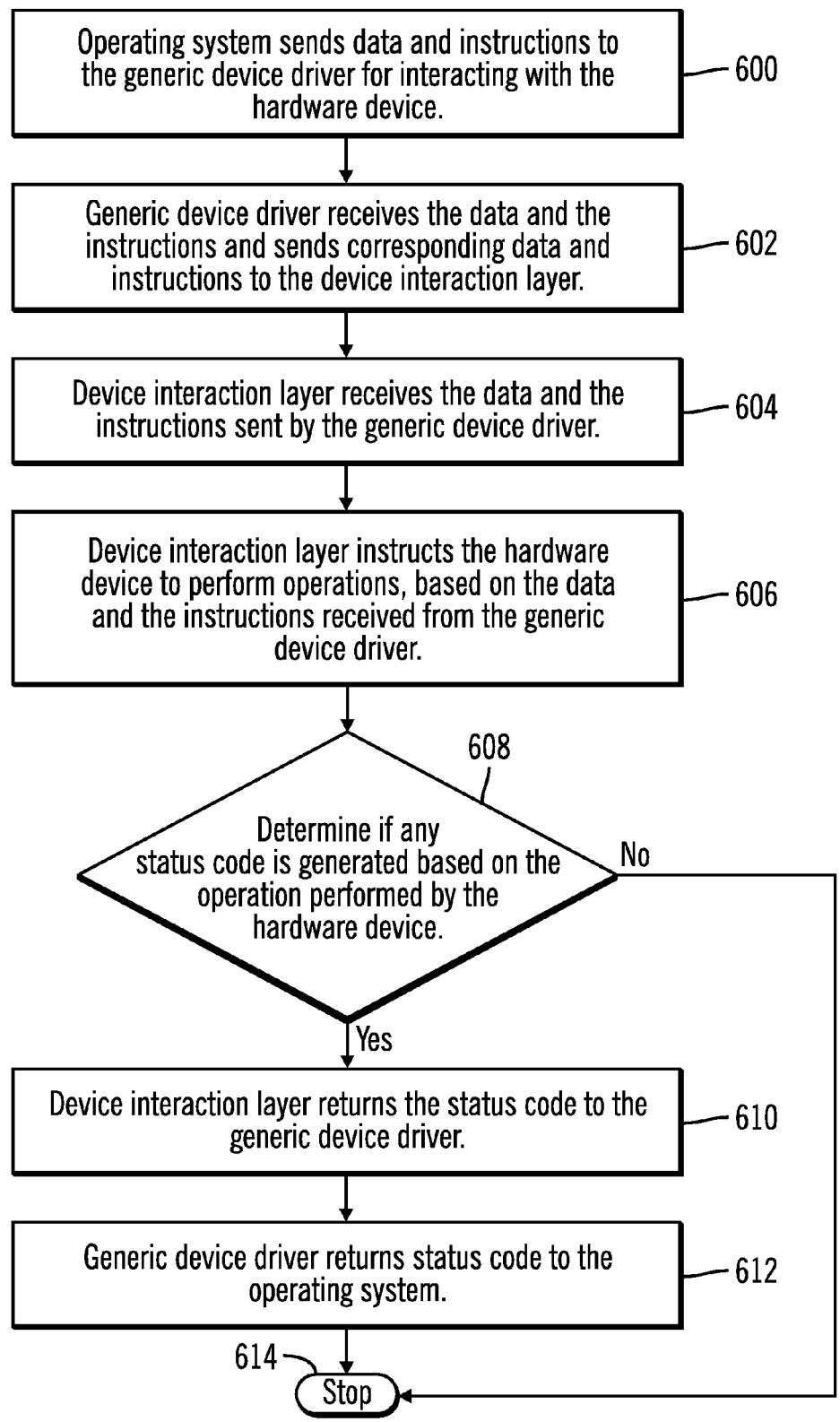
FIG. 6 illustrates operations described with respect to FIGS. 1-5, in accordance with certain embodiments.

FIG. 6 illustrates operations described with respect to the computing environment 100 described in FIGS. 1-5, in accordance with certain embodiments. The operations allow the single generic device driver 110 to exploit the capabilities of different versions of the device 102, where the different versions of the device 102 include different device interaction layers 114.

Control starts at block 600, where the operating system 108 sends data 400 and instructions 402 to the generic device driver 110 for interacting with the device 102. In certain embodiments, the data 400 and the instructions 402 may be sent to the generic device driver 110 by calling an interface of the generic device driver 110 with the data 400 as parameter, where the interface is called from the operating system 108. The data 400 and instructions 402 may have been generated by an application that runs of the host 104.

The generic device driver 110 receives the data 400 and the instructions 402 and sends (at block 602) corresponding data 404 and corresponding instructions 406 to the device interaction layer 114. In certain embodiments, the data 404 and the instructions 406 may be sent to the device interaction layer 114 by calling an interface of the device interaction layer 114. The device interaction layer 114 receives (at block 604) the data 404 and the instructions 406 sent by the generic device driver 110.

The device interaction layer 114 instructs (at block 606) the device 102 to perform operations, based on the data 404 and the instructions 406 received from the generic device driver 110. The device interaction layer 114 determines (at block 608) whether any status code is generated by the device 102 based on the operations performed by the device 102. If so, the device interaction layer 114 returns (at block 610) the status code to the generic device driver 114. In certain embodiments, the status code may be returned to the generic device driver 110 via the data 500 and the instructions 502, where the data 500 is the status code and the instructions 502 indicate that the data 500 is the status code.

The generic device driver 110 returns (at block 612) the status code to the operating system 108 and the process stops (at block 614). In certain embodiments, the status code may be returned to the operating system 108 via the data 504 and the instructions 506, where the data 504 is the status code and the instructions 506 indicate that the data 504 is the status code.

If the device interaction layer 114 determines (at block 608) that no status code is generated based on the operation performed by the device 102 then the process stops (at block 614).

FIG. 6 illustrates certain embodiments in which data and instructions from an application are used by the operating system 108, the generic device driver 110, and the device interaction layer 114 to perform corresponding operations of the device 102.

Figure 7:
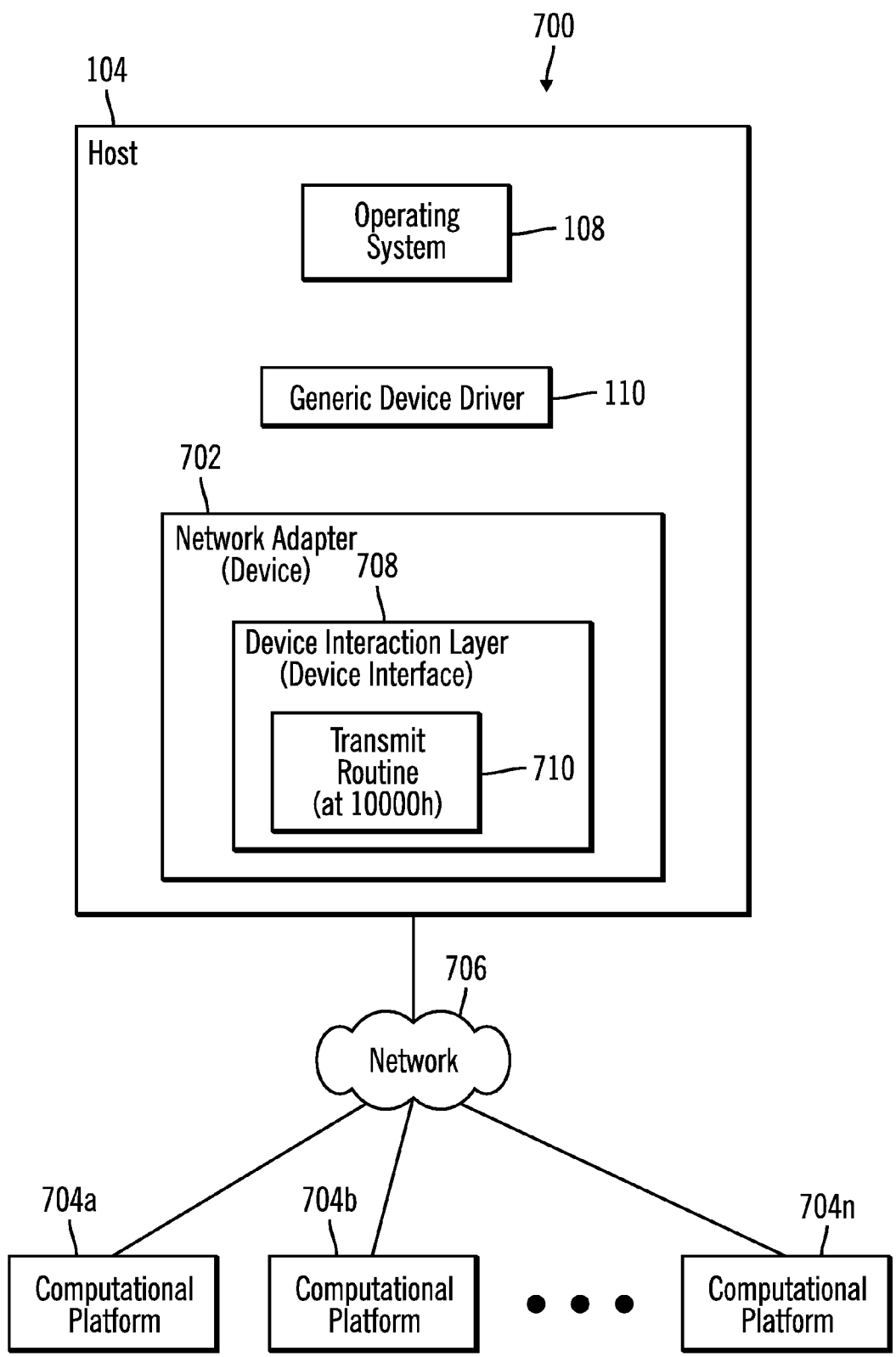
FIG. 7 illustrates a network computing environment, in accordance with certain embodiments.

FIG. 7 illustrates a network computing environment 700 comprising the host 104 and a network adapter coupled to a network, in accordance with certain embodiments. The network computing environment 700 includes a network adapter 702 in the host 104. The network adapter 700 couples the host 104 to a plurality of computational platforms 704a . . . 704n via one or more networks 706. In certain alternative embodiments, other devices besides the computational platforms 704a . . . 704n may be coupled to the one or more networks 706.

The network adapter 702 may include a device interaction layer 708, where the device interaction layer 708 includes one or more routines for exploiting various capabilities of the network adapter 702. For example, in certain embodiments, a transmit routine 710 may be included in the device interaction layer 708, where the code corresponding to the transmit routine 710 is kept at memory address offset 10000h in the flash memory of the network adapter 702. In certain alternative embodiments, the transmit routine 710 may be kept at other memory address offsets. Additionally, other types of memory besides flash memory may be used to store the transmit routine 710. The memory address offset of the transmit routine 710 is known to the generic device driver 110 and does not change in different versions of the device interaction layer 708. The transmit routine 710 may include code to transmit packets from the network adapter 702 to the computations devices 704a . . . 704n via the network 706.

The network computing environment 700 is an example of the computing environment 100, where the network adapter 702 may correspond to the device 102 and the device interaction layer 708 of the network adapter 702 may correspond to the device interaction layer 114 of the device 102.

Figure 8:
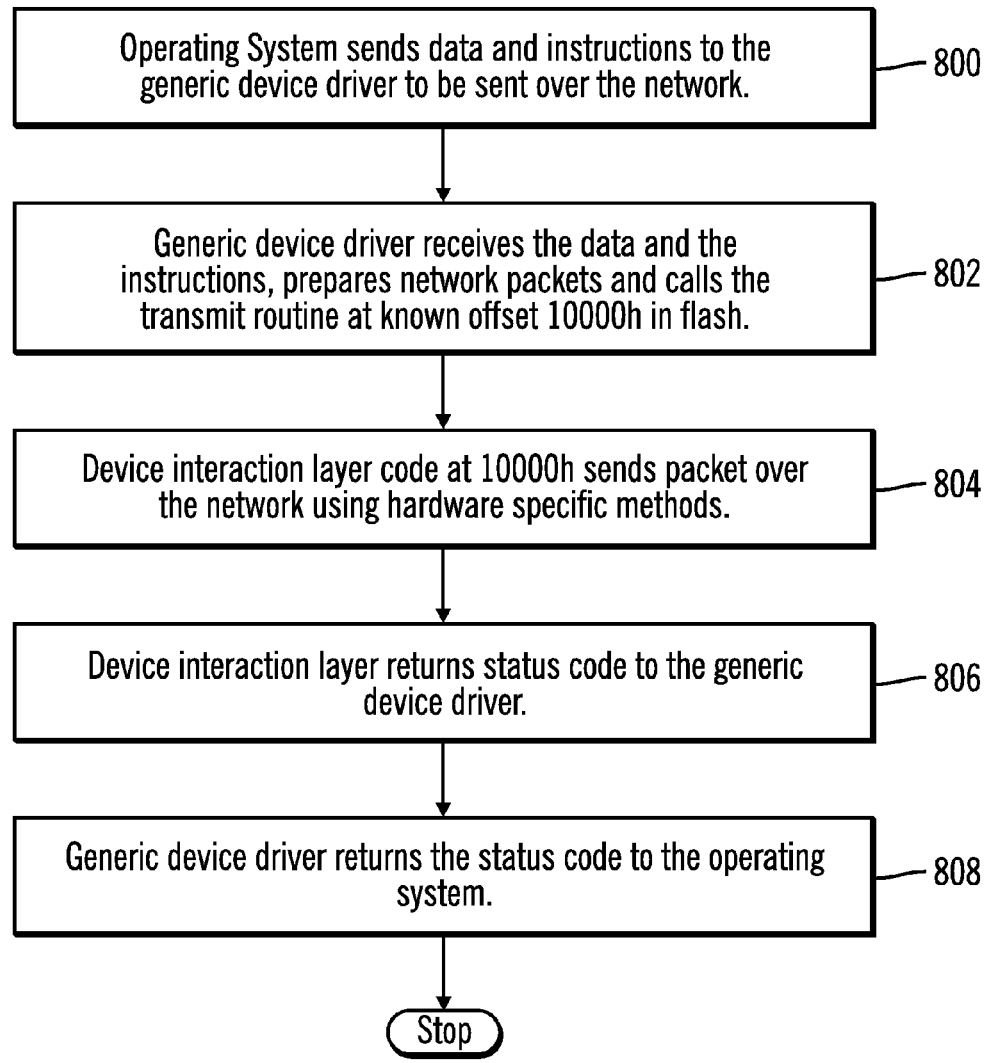
FIG. 8 illustrates operations described with respect to the network computing environment of FIG. 7, in accordance with certain embodiments.

FIG. 8 illustrates operations described with respect to the network computing environment 700 of FIG. 7, in accordance with certain embodiments.

Control starts at block 800, where the operating system 108 sends data and instructions to the generic device driver 110 to be sent over the network 706. The generic device driver 110 receives the data and the instructions, prepares network packets, and calls (at block 802) the transmit routine 710 at the known offset 10000h in flash memory.

The transmit routine 710 located at offset 10000h sends (at block 804) packets over the network 706 using hardware specific methods of the network adapter 702. The device interaction layer 708 returns (at block 806) a status code to the generic device driver 110, where the status code may have been generated as a result of sending the packets over the network 706.

The generic device driver 110 returns (at block 808) the status code to the operating system 108 and the process stops (at block 810).

The generic device driver 110 does not need to be aware of the specifics of how the underlying transmit routine 710 is implemented. In order to function, the generic device driver 110 may set some common parameters and branch execution to the device interaction layer 708. The device interaction layer 708 handles the hardware specifics of transmitting the packet and corresponding status codes.

FIG. 8 describes certain embodiments in which the device interaction layer 708 of the network adapter 702 controls hardware specific commands of the network adapter 702. The generic device driver 110 calls routines of the device interaction layer 702 to control various functions of the network adapter 702. A different version of the network adapter 702 may be equipped with a different version of the device interaction layer 708 and function with the same generic device driver 110.

Figure 9:
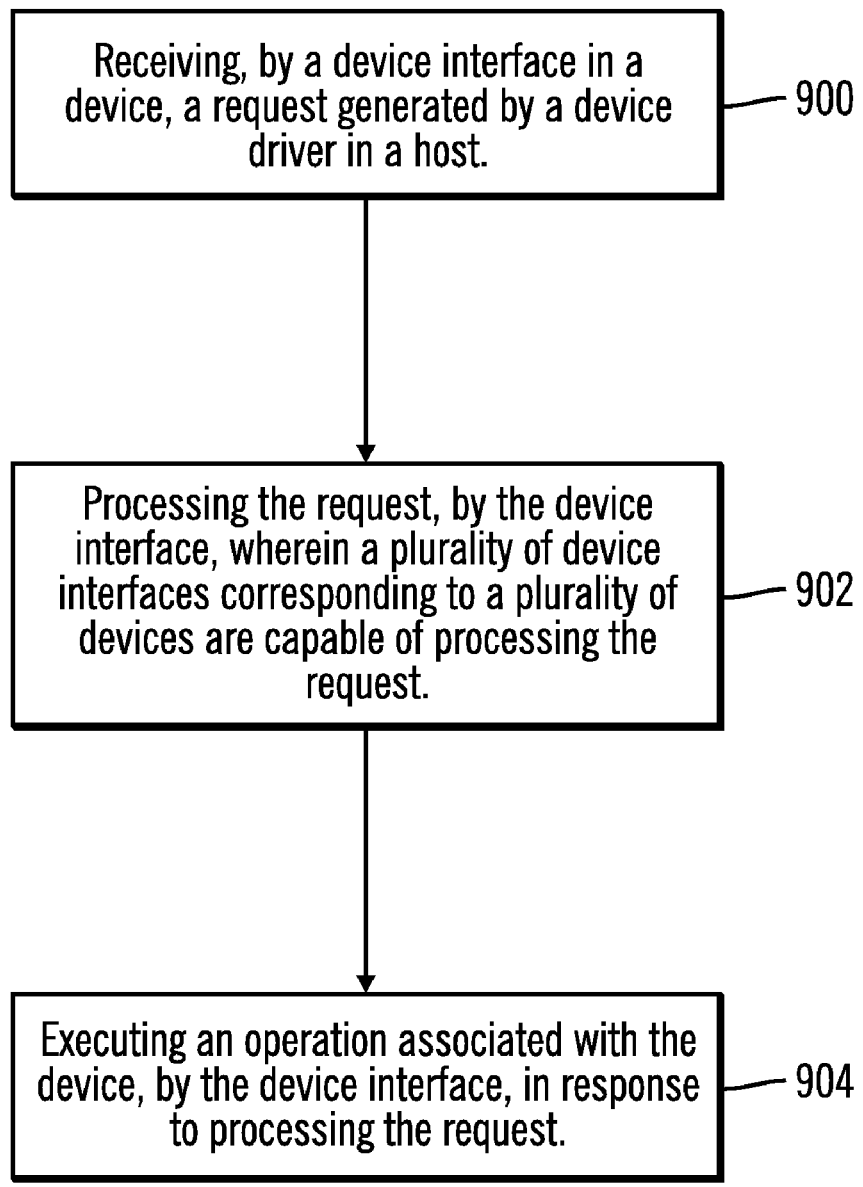
FIG. 9 illustrates operations performed by a device interface of the computing environments illustrated in FIGS. 1 and 7.

FIG. 9 illustrates operations performed by a device interface, such as, the device interaction layer 114, to interface the device 102 to the host 104. Control starts at block 900, where the device interface 114 in the device 102 receives a request generated by the device driver 110 in the host 104.

The device interface 114 processes (at block 902) the request, where a plurality of device interfaces corresponding to a plurality of devices are capable of processing the request. The device interaction layer 114 executes (at block 904) the operations associated with the device 102, in response to processing the request.

FIG. 9 describes an embodiment in which the device interface 114 can execute operations associated with the device 102 in response to requests from the generic device driver 110.

In certain embodiments, once a generic device driver 110 is installed on a host 104, all versions of the device 102 that have a specifically implemented device interaction layer 114 corresponding to the version of the device 102 can interface to the host 104 via the generic device driver 110. No additional device driver is required by the host 104. Furthermore, if the device interaction layer 114 is shipped with the device 102, the host 104 can take advantage of the features of the underlying device 102. Additionally, errors in a previous version of a device may be corrected by the device interaction layer 114 of a newer version of the device.

When an upgrade of a device 102, such as, an upgraded network adapter 702, is available, the device interaction layer 114 may have to be updated. Although, the device interaction layer 114 may be updated, the device interaction layer 114 may still use the same generic device driver 110 on the host 104. If the operating system 108 on the host 104 is upgraded or reinstalled, the device interaction layer 114 that runs would still interface with the generic device driver 110 provided with the upgraded or reinstalled operating system. There is no need for a user to determine the latest device driver corresponding to the device 102 when the operating system 108 is upgraded or reinstalled.

The embodiments allow forward compatibility from old device drivers to new hardware devices. Device driver specific errors may be corrected in the device interaction layer 114 rather than in the device driver. Since the main functionality specific to a hardware device may be included in the flash ROM within the hardware device 102, an older device driver in the form of the generic device driver 110 would work with new hardware devices without any updates to the generic device driver 110.

Additionally, once the generic device driver 110 is included with the operating system 108 installs, a hardware manufacturer no longer needs to distribute software device drivers via a storage medium, such as, floppy disks or CD-ROMs.

Furthermore, the embodiments allow a hardware device 102 to be shipped with the latest device driver, in the form of the device interaction layer 114, built into the hardware device 102. The host 104 can use the latest device driver, in the form of the device interaction layer 114, when a new hardware device is. coupled to the host 104.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art.

Figure 10:
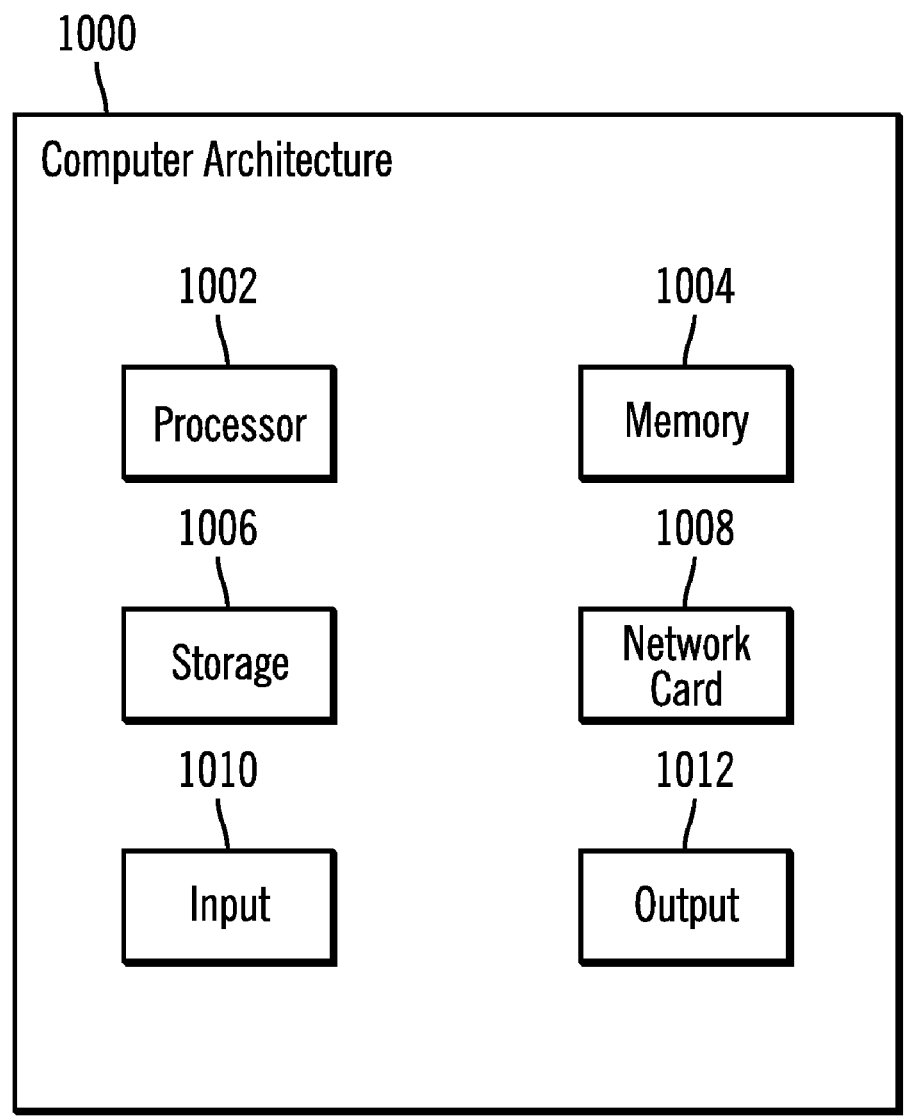
FIG. 10 illustrates a computer architecture in which certain described embodiments are implemented.

FIG. 10 illustrates a block diagram of a computer architecture in which certain embodiments are implemented. FIG. 10 illustrates one embodiment of the host system 104 and certain elements of the devices 102, 702. The host system 104 and the devices 102, 702 may implement a computer architecture 1000 having a processor 1002 (such as processors 106, 112), a memory 1004 (e.g., a volatile memory device), and storage 1006. Not all elements of the computer architecture 1000 are found in the host system 104 and the devices 102, 702. The storage 1006 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1006 may comprise an internal storage device, an attached storage device and/or a network accessible storage device. Programs in the storage 1006 may be loaded into the memory 1004 and executed by the processor 1002 in a manner known in the art. The architecture may further include a network card 1008 to enable communication with a network. The architecture may also include at least one input device 1010, such as a keyboard, a touchscreen, a pen, voice-activated input, etc., and at least one output device 1012, such as a display device, a speaker, a printer, etc.

In certain embodiments, device 102, such as, the network adapter 702, may be included in a computer system including any storage controller, such as a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Alternatively, certain embodiments of the device 102 may be included in a system that does not include a storage controller, such as certain hubs and switches.

Certain embodiments may be implemented in a computer system including a video controller to render information to display on a monitor coupled to the computer system including the device 102, such as, the network adapter 702, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIGS. 6, 8, and 9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components. In certain embodiments the network adapter may be a specialized part of the central processing unit of the host system.

The data structures and components shown or referred to in FIGS. 1-10 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for interfacing a network adapter to a host, comprising:

receiving, by a device interface in the network adapter, a request generated by a device driver in the host, wherein the request is generated by the device driver by calling a routine located at a fixed offset in a memory of the network adapter, wherein the routine is included in the device interface, and wherein the device driver includes information corresponding to a location of the fixed offset of the routine;

processing the request, by the device interface, wherein a plurality of device interfaces corresponding to a plurality of network adapters are capable of processing the request;

executing an operation associated with the network adapter, by the device interface, in response to processing the request, wherein the device interface is included in a flash memory in the network adapter, wherein the device interface is executed by a processor located in the network adapter, and wherein the device interface can exploit hardware capabilities of the network adapter; and modifying the device interface in the network adapter in response to the network adapter being upgraded, wherein the device driver remains unchanged in the host, wherein the unchanged device driver interfaces correctly with the modified device interface in the network adapter, and wherein the unchanged device driver interfaces with all previous versions of the network adapter and with all modified versions of the network adapter.

2. The method of claim 1, further comprising:
sending data and instructions from an operating system in the host to the device driver; and
generating the request, by the device driver, based on the data and the instructions, wherein one device driver is capable of generating the request for the plurality of device interfaces.

3. The method of claim 1, further comprising:
returning a status code, by the device interface, to the device driver, in response to determining that the status code is generated based on executing the operation associated with the network adapter.

4. The method of claim 1, wherein the request is for transmitting a packet, and wherein the method further comprises:
including a transmit routine for transmitting packets in the device interface, at the fixed offset in the memory of the network adapter, wherein the device driver includes information corresponding to the location of the fixed offset; and
calling the transmit routine at the fixed offset, from the device driver, to generate the request for transmitting the packet.

5. The method of claim 1, wherein the device interface is executed by a processor located in the host.

6. The method of claim 1, further comprising:
replacing the network adapter by a new network adapter, wherein the new network adapter includes a new device interface;
receiving, by the new device interface in the new network adapter, a new request generated by the device driver in the host;
processing, by the new device interface, the new request; and
executing a new operation associated with the new network adapter, by the new device interface, in response to processing the new request.

7. The method of claim 1, the method further comprising:
distributing the device driver in the host with an operating system that can be installed on the host; and
distributing the device interface in association with the network adapter.

8. A network adapter, comprising:
a device interface in the network adapter, wherein the device interface is capable of receiving a request generated by a device driver in a host, wherein the device interface is capable of processing the request, and wherein a plurality of device interfaces corresponding to a plurality of network adapters are capable of processing the request;
code implementing an operation associated with the network adapter, wherein the device interface is capable of executing the code in response to processing the request;
a memory coupled to the network adapter;
a routine located at a fixed offset in the memory, wherein the routine is included in the device interface, wherein the device driver is capable of generating the request by calling the routine, and wherein the device driver is capable of including information corresponding to a location of the fixed offset of the routine;
a processor located in the network adapter; and
a flash memory in the network adapter, wherein the device interface is included in the flash memory, wherein the device interface is capable of being executed by the processor located in the network adapter, and wherein the device interface can exploit hardware capabilities of the device, wherein the device interface in the network adapter is modified in response to the network adapter being upgraded, wherein the device driver remains unchanged in the host, wherein the unchanged device driver interfaces correctly with the modified device interface in the network adapter, and wherein the unchanged device driver interfaces with all previous versions of the network adapter and with all modified versions of the network adapter.

9. The network adapter of claim 8, further comprising:
code for receiving the request, wherein the code for receiving the request is implemented in the device interface, wherein the request is capable of being generated by the device driver, based on data and instructions sent from an operating system in the host to the device driver, wherein one device driver is capable of generating the request for the plurality of device interfaces.

10. The network adapter of claim 8, further comprising:
code for returning a status code, wherein the code for returning the status code is implemented in the device interface, wherein the status code is capable of being returned by the device interface to the device driver, in response to determining that the status code is generated based on executing the operation associated with the network adapter.

11. The network adapter of claim 8, wherein the request is for transmitting a packet, and wherein the network adapter further comprises:
a transmit routine for transmitting packets in the device interface, at the fixed offset in the memory of the network adapter, wherein the device driver is capable of including information corresponding to the location of the fixed offset, and wherein the device driver is capable of calling the transmit routine at the fixed offset to generate the request for transmitting the packet.

12. The network adapter of claim 8, wherein the device interface is capable of being executed by a processor located in the host.

13. The network adapter of claim 8, wherein the network adapter is capable of being replaced by a new network adapter, wherein the new network adapter is capable of including a new device interface, wherein the new device interface in the new network adapter is capable of receiving a new request generated by the device driver in the host, wherein the new device interface is capable of processing the new request, and wherein the new device interface is capable of executing a new operation associated with the new network adapter in response to processing the new request.

14. The network adapter of claim 8, wherein the device driver in the host is capable of being distributed with an operating system that is capable of being installed on the host, and wherein the device interface is capable of being distributed in association with the network adapter.

15. A system in communication with data storage, comprising:
a host;
a data storage controller to manage Input/Output (I/O) access to the data storage, wherein the data storage controller is coupled to the host;
a device driver in the host;

a network adapter coupled to the host;

a device interface in the network adapter, wherein the device interface is capable of receiving a request generated by the device driver, wherein the device interface is capable of processing the request, and wherein a plurality of device interfaces corresponding to a plurality of network adapters are capable of processing the request;

code implementing an operation associated with the network adapter, wherein the device interface is capable of executing the code in response to processing the request;

a memory coupled to the network adapter;

a routine located at a fixed offset in the memory, wherein the routine is included in the device interface, wherein the device driver is capable of generating the request by calling the routine, and wherein the device driver is capable of including information corresponding to a location of the fixed offset of the routine;

a processor located in the network adapter; and a flash memory in the network adapter, wherein the device interface is included in the flash memory, wherein the device interface is capable of being executed by the processor located in the network adapter, and wherein the device interface can exploit hardware capabilities of the device, wherein the device interface in the network adapter is modified in response to the network adapter being upgraded, wherein the device driver remains unchanged in the host, wherein the unchanged device driver interfaces correctly with the modified device interface in the network adapter, and wherein the unchanged device driver interfaces with all previous versions of the network adapter and with all modified versions of the network adapter.

16. The system of claim 15, further comprising:

an operating system in the host, wherein the operating system is capable of sending data and instructions to the device driver, and wherein the device driver is capable of generating the request based on the data and the instructions, and wherein one device driver is capable of generating the request for the plurality of device interfaces.

17. The system of claim 15, the system further comprising:

an operating system that is capable of being installed on the host, wherein the device driver is capable of being distributed with the operating system, and wherein the device interface is capable of being distributed with the network adapter.

18. A computer readable storage medium having stored therein instructions for interfacing a network adapter to a host, wherein the instructions when executed causes operations, the operations comprising:

receiving, by a device interface in the network adapter, a request generated by a device driver in the host, wherein the request is generated by the device driver by calling a routine located at a fixed offset in a memory of the network adapter, wherein the routine is included in the device interface, and wherein the device driver includes information corresponding to a location of the fixed offset of the routine;

processing the request, by the device interface, wherein a plurality of device interfaces corresponding to a plurality of network adapters are capable of processing the request;

executing an operation associated with the network adapter, by the device interface, in response to processing the request, wherein the device interface is included in a flash memory in the network adapter, wherein the device interface is executed by a processor located in the network adapter, and wherein the device interface can exploit hardware capabilities of the network adapter; and modifying the device interface in the network adapter in response to the network adapter being upgraded, wherein the device driver remains unchanged in the host, wherein the unchanged device driver interfaces correctly with the modified device interface in the network adapter, and wherein the unchanged device driver interfaces with all previous versions of the network adapter and with all modified versions of the network adapter.

19. The computer readable storage medium of claim 18, the operations further comprising:

sending data and instructions from an operating system in the host to the device driver; and generating the request, by the device driver, based on the data and the instructions, wherein one device driver is capable of generating the request for the plurality of device interfaces.

20. The computer readable storage medium of claim 18, the operations further comprising:

returning a status code, by the device interface, to the device driver, in response to determining that the status code is generated based on executing the operation associated with the network adapter.

21. The computer readable storage medium of claim 18, wherein the request is for transmitting a packet, and wherein the operations further comprise:

including a transmit routine for transmitting packets in the device interface, at the fixed offset in the memory of the network adapter, wherein the device driver includes information corresponding to the location of the fixed offset; and calling the transmit routine at the fixed offset, from the device driver, to generate the request for transmitting the packet.

22. The computer readable storage medium of claim 18, wherein the device interface is executed by a processor located in the host.

23. The computer readable storage medium of claim 18, wherein the operations further comprise:

receiving by a new device interface in a new network adapter, a new request generated by the device driver in the host, wherein the network adapter is replaced by the new network adapter, and wherein the new network adapter includes the new device interface;

processing, the new request, by the new device interface; and executing a new operation associated with the new network adapter, by the new device interface, in response to processing the new request.

24. The computer readable storage medium of claim 18, wherein the device driver in the host is capable of being distributed with an operating system that can be installed on the host, and wherein the device interface is capable of being distributed in association with the network adapter.

* * * * *